Sept. 15, 1964     N. VISZLOCKY     3,149,236

ATOMIC BATTERY AND TEST INSTRUMENT

Original Filed Feb. 23, 1960

INVENTOR
NICHOLAS VISZLOCKY

BY *Fidelman & Wolffe*
ATTORNEYS

United States Patent Office 3,149,236
Patented Sept. 15, 1964

3,149,236
ATOMIC BATTERY AND TEST INSTRUMENT
Nicholas Viszlocky, New York, N.Y.
(79—08 147th St., Kew Gardens, Long Island, N.Y.)
Original application Feb. 23, 1960, Ser. No. 10,368, now Patent No. 3,053,927, dated Sept. 11, 1962. Divided and this application Jan. 4, 1962, Ser. No. 167,208
7 Claims. (Cl. 250—225)

This invention relates to a test or like instrument utilizing nuclear energy powered batteries.

This application is a continuation-in-part of my copending application Serial No. 590,768 now abandoned, filed June 11, 1956, for "Atomic Battery" and a division of application Serial No. 10,368 now Patent 3,053,927.

A major problem with chemically actuated batteries lies in the comparatively short battery life. The amount of electrical energy produced by chemical reaction inside the battery cell depends strictly on the mass of reactive materials incorporated in the battery. Since the total weight of the battery is frequently limited for one reason or another, small batteries deliver a distressingly low amount of ampere hours.

The energy produced by nuclear energy is many times greater than the energy produced by chemical reactions. For battery purposes, substantially direct conversion of the nuclear energy to electricity is essential. Even with the restrictions imposed by safety requirements, a small nuclear energy powered battery would be extremely desirable for many purposes, and in particular wherever a constant drain of current is needed.

An object of this invention is to provide a portable, hand carried nuclear powered battery.

Objects pertaining to the test or like instrument aspects of this invention are to provide a battery capable of giving an adjustable and/or variable output; an instrument capable of giving an output variable in response to linear or angular movement; an instrument for comparing two linear or angular movements; a simple or comparison-type densitometer; a simple or comparison-type polarimeter; a simple or comparison-type liquid level indicator; an ultrasonic detector.

Briefly stated this invention comprises the combination of a radioactive light source and at least one photocell. The photocell is, of course, provided with leads so that current utilizing devices can be attached thereto. Suitable shielding is provided around the battery.

Radium-activated light sources (self luminous) have been available for a long time. Such light sources are characterized by low light level (50 micro-lamberts), rapid and unpredictable light decay, undesirable radiation hazards associated with their use, and their associated decay products.

These light sources are by their very nature unsuitable for the conversion of light into electricity (photo electricity) for commercial use.

Strontium 90 activated fluorescent light sources are peculiarly advantageous for purposes of this battery. They have a high level of light output and a low level of radiation output, compared for example to radium activated light sources. Also, strontium 90 activated fluorescent self luminous light sources can be fabricated in a wide range of brightness throughout the visible spectrum which is desirable since different photocells have a peak response in different parts of the visible spectrum.

Such light sources fabricated from strontium 90 activated fluorescent materials show excellent luminous decay characteristics having a relatively low and predictable decay in luminous intensity and having a relatively long life as compared to other self luminous sources. Furthermore, with proper shielding, the inherent radiation hazard is substantially nil.

The photocell, upon which the light from the strontium 90 light source impinges, serves to convert the light energy into electrical energy. Highly efficient photocells, e.g. selenium, silicon, are commercially available, and their construction forms no part of the instant invention. However, it should be noted that there is a correlation between the characteristics of the light source and those of the photocell. Insofar as the photocell is capable of converting light into electrical energy, this characteristic determines the type of phosphor in the light source.

The invention will be better understood when taken in connection with the accompanying drawing in which.

Figure 1:
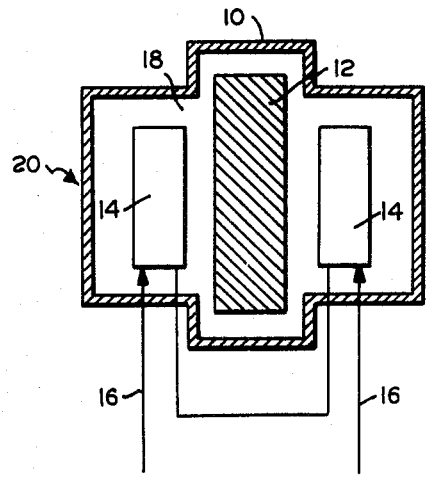
FIG. 1 illustrates a preferred mode of battery construction.

The battery 10 as a whole is comprised by a self luminous strontium 90 activated light source 12. Light source 12 contains strontium 90 and one or more suitable phosphors such as ZnS, CdSAg, ZnSAg, etc. intimately admixed and bound in a glass matrix. Other materials transparent to radiation are contemplated as well, e.g. plastics, fused quartz, etc. On each side of light source 12 is a photocell 14 adapted to convert the light energy emitted by source 12 into electrical energy. Leads 16 connected to photocells 14 draw off the electrical energy to a point of utilization. As shown in the drawing the photocells may be connected in series to increase voltage, or if desired in parallel to provide increased current. Although the output of a single such battery is low, it may be sufficient for circuits needing but small amounts of current, e.g. transistors. Also, if necessary, several batteries may be connected to provide the needed amount of electrical energy.

Preferably, photocells 14 are spaced from light source 12 by an airgap 18 or a light transparent separating layer. The separation need only be of such width to serve to prevent chemical interaction between the photocell material and the materials in light source 12. A gap of less than 10 microns is sufficient.

The whole battery unit 10 is encased by a shielding substance 20, e.g. lead, to ensure that no radiation primary or secondary emitted by the strontium 90 escapes beyond the battery confines and endangers the user.

Figure 2:
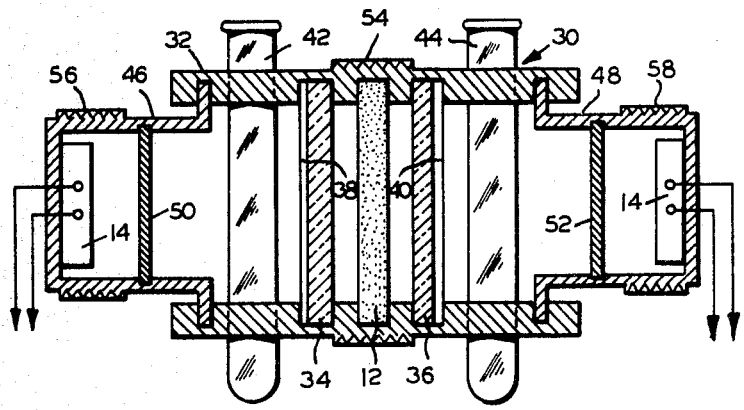
FIG. 2 illustrates an instrument or like type device based thereon.

With the test device 30 shown in FIG. 2, external shielding 32, which may be in the form of a tubular housing, is provided. Centrally in the shielding 32 is a light source consisting of strontium 90 and a phosphor 12 having on either side thereof transparent separating means 34 and 36 which may be glass. Adjacent the means 34 and 36 are polarizers 38 and 40, positioned as shown. Transparent test chambers 42 and 44, which may be open at their both ends or at only one end, are provided behind the polarizers. These chambers as shown in FIG. 2 are merely common test tubes oriented so that their open ends extend upwardly.

Two revolvable shielding elements 46 and 48 are journaled with shielding 32, at opposite ends thereof, and house the analyzers 50 and 52 and the photocells 14. Analyzers 50 and 52 are actually polarizer plates, like polarizers 38, 40. The external shielding member 32 has a central knurled circumferential strip 54 while the revolvable shielding elements each have a circumferential knurled strip 56 and 58 respectively.

Light emitted from light source 12 and polarized can be received by and activate the photocells. Rotation of elements 46 and 48 can vary the total light received by photocells 14, as can the density of material in the test chambers 42 and 44. Either of the elements 46 and 48 can be rotated with respect to the central shielding 32 by gripping the central knurl 54 in one hand and the knurl 56 or 58 on a rotatable element 46 or 48 respectively, with the other hand, turning one with respect to the other.

The test device 30 may be used as a comparison or null instrument. The test tubes 42 and 44 are filled, one with a test fluid and the other standard fluid. The reading on the scale of the guage after the test fluid is added gives an indication of the translucency of the test fluid. The adjustability of the test device 30, with rotatable polarizing elements, provides a very compact portable and versatile instrument.

With elimination of light variation effects, the device 30 can be used to provide for—

(1) Independently adjustable photocell outputs for varied circuit needs—bias voltages, stable voltage-reference sources, etc.

(2) Independent photocell outputs proportional to angular rotation of elements 46 and 48 with reference to the shielding 32. Any action, function, or device which provides an angular displacement or rotation, is capable of detection, measurement, comparison and control.

(3) Independent photocell outputs proportional to linear displacement. Any action, function, or device producing linear movement or displacement can cause a light-modifying means to pass through the test chambers, thereby producing variations in photocell output which can be used to detect, measure, compare or control the linear movement or displacement.

The device 32 as an atomic electro-optical device, can be used, either in its entirety, for comparison, or one-half thereof. Some uses are:

(1) A simple or comparison-type densitometer which can measure or indicate the thickness of a plating or coating and the impurity concentration in liquids and gases. In the simple type either test chamber may be used to contain the specimen being tested. In the comparison-type one chamber contains the standard while the other contains the specimen undergoing test or comparison.

(2) A simple or comparison-type of polarimeter which can indicate the amount of specific rotation produced in the plane of polarization of light in optically active substances. Commercially and medicinally, the amount of rotation produced affords a method of estimating the concentration of a given substance present in a solution. As in the densitometer application, either chamber may be employed independently of the other or in combination for comparison.

(3) A simple or comparison-type of liquid level indicator which can indicate or control the level of a variety of liquids. As such the test chambers are made part of the liquid container and located at the desired height of liquid level.

(4) As an ultrasonic detector whereby any changes in the index of refraction of a liquid or transparent solid contained in the test chambers varies photocell outputs, said device can function for the detection and control of such ultrasonic waves.

Although preferred embodiments of the invention have been described it will be obvious to those skilled in the art that various changes and modifications may be made without departing from the true spirit and scope of this invention.

What is claimed is:

1. In combination, a light source, said light source comprising means for emitting solely beta particles and a beta-excitable phosphor intimately admixed therewith, first polarizers, one on each side of said light source and outwardly thereof, transparent test chambers, one on each side of said light source outwardly of each of said first polarizers, second polarizers, one on each side of said light source outwardly of each said test chamber, a pair of photocells for receiving light from said light source, and means mounting said photocells and said second polarizers for rotary motion relative to said light source and said first polarizers.

2. A portable nuclear powered compact test instrument comprising: a central hollow open ended cylindrical β-ray shielding member, a light source composed of a β-ray emitter and a β-ray excitable phosphor intimately mixed therewith, said light source being fixedly mounted centrally within the cylindrical shielding member; a first polarizing means fixedly mounted in said cylindrical shielding member between said source and each end of said shielding member, a transparent test chamber fixedly mounted in said cylindrical shielding member outwardly of each of the first polarizer means; a pair of revolvable cylindrical shielding elements each having a closed end and an open end, means rotatably and sealably connecting the open end of each revolvable shielding element with an open end of said central cylindrical shielding member in a coaxial relationship, a second polarizing means mounted in each of said revolvable shielding elements, a photocell fixed in each of said revolvable shielding elements between the closed end thereof and said second polarizing means.

3. The test instrument of claim 2 wherein each of said transparent test chambers is an elongated cylinder open at one end and closed at the other, said test chambers being parallel and extending diametrically across said shielding member with the open ends thereof communicating with the surfaces of said shielding member so that the points formed by the intersection of the axes of said test chambers at the open ends thereof and said outer surface of shielding member define a line parallel with the axis of the shielding member.

4. The test instrument of claim 3 wherein said first and second polarizer means are each composed of a light oriented circular disc fixedly mounted in a circular groove in the inner wall of the shielding member and the shielding elements.

5. The test instrument of claim 2 wherein said means rotatably and sealably connecting the open end of each revolvable shielding element with an open end of said central cylindrical shielding in a coaxial relationship comprises an integral circumferential radial flange adjacent the open end of each shielding element, said flange fitting into a corresponding circular groove within the inner wall of the shielding member adjacent an end thereof.

6. The test instrument of claim 5 wherein there is an encircling knurled portion centrally formed on the outer surface of said shielding member and an encircling knurled portion formed on the outer surface of each shielding element whereby said central shielding member may be gripped by one hand while a shielding element is revolved by the other hand.

7. The test instrument of claim 2 wherein a transparent separating means is included between each first polarizing means and said light source.

References Cited in the file of this patent

UNITED STATES PATENTS

| | | |
|---|---|---|
| 1,934,187 | Glasgow et al. | Nov. 7, 1933 |
| 2,259,372 | Geisler | Oct. 14, 1941 |
| 2,513,283 | Cahusac et al. | July 4, 1950 |
| 2,919,358 | Marrison | Dec. 29, 1959 |

OTHER REFERENCES

Thomas: Nuclear Batteries, Nucleonics, vol. 13, No. 11, November 1955, pp. 129–133.